United States Patent
Hirochi et al.

(10) Patent No.: US 7,157,877 B2
(45) Date of Patent: Jan. 2, 2007

(54) BRUSHLESS MOTOR DRIVING DEVICE

(75) Inventors: Takeshi Hirochi, Kariya (JP); Toshio Tsutsui, Takahama (JP); Masahiro Miyata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/052,078

(22) Filed: Feb. 8, 2005

(65) Prior Publication Data

US 2005/0184688 A1 Aug. 25, 2005

(30) Foreign Application Priority Data

Feb. 24, 2004 (JP) .............................. 2004-047534

(51) Int. Cl.
*H02P 7/29* (2006.01)
(52) U.S. Cl. ..................... 318/454; 318/254; 318/445; 318/449; 318/638; 318/640
(58) Field of Classification Search ..................... None
See application file for complete search history.

(56) References Cited

U.S. PATENT DOCUMENTS

| | | | | |
|---|---|---|---|---|
| 4,714,068 A * | 12/1987 | Nagase et al. | ............... | 123/506 |
| 4,734,631 A * | 3/1988 | Kamikura et al. | ........... | 318/685 |
| 4,868,467 A * | 9/1989 | Davis | ........................ | 318/254 |
| 4,868,478 A * | 9/1989 | Hedlund et al. | ............ | 318/696 |
| 5,200,684 A * | 4/1993 | Fisher | ........................ | 318/809 |
| 5,479,085 A * | 12/1995 | Honda et al. | ................ | 320/134 |
| 5,486,743 A * | 1/1996 | Nagai | ........................ | 318/439 |
| 5,530,326 A * | 6/1996 | Galvin et al. | ................ | 318/254 |
| 5,736,948 A * | 4/1998 | Mitsuishi et al. | ........... | 341/141 |
| 5,760,556 A * | 6/1998 | Hamilton et al. | ........... | 318/438 |
| 5,825,150 A * | 10/1998 | Kachi et al. | ................. | 318/610 |
| 5,889,376 A * | 3/1999 | Takatsuka et al. | .......... | 318/434 |
| 6,035,265 A * | 3/2000 | Dister et al. | ................ | 702/183 |
| 6,131,692 A * | 10/2000 | Kawasuji | ..................... | 180/446 |
| 6,246,197 B1 * | 6/2001 | Kurishige et al. | .......... | 318/432 |
| 6,288,513 B1 | 9/2001 | Green | | |
| 6,441,572 B1 * | 8/2002 | Batzel | ........................ | 318/254 |
| 6,545,443 B1 * | 4/2003 | Kushida | ..................... | 318/727 |
| 6,586,902 B1 * | 7/2003 | Gotou et al. | ................ | 318/560 |
| 6,611,771 B1 | 8/2003 | Habetler et al. | | |
| 6,643,088 B1 * | 11/2003 | Kawachi | ..................... | 360/75 |
| 6,650,245 B1 * | 11/2003 | Chung | ........................ | 340/648 |
| 6,683,799 B1 * | 1/2004 | Kato et al. | .................... | 363/37 |
| 6,715,301 B1 * | 4/2004 | Song | ............................... | 62/6 |

(Continued)

FOREIGN PATENT DOCUMENTS

EP 1 020 985 A1 7/2000

(Continued)

OTHER PUBLICATIONS

Search Report dated Aug. 25, 2006 from European Patent Office for counterpart application of 0501788000.

*Primary Examiner*—Lincoln Donovan
*Assistant Examiner*—Robert W. Horn
(74) *Attorney, Agent, or Firm*—Posz Law Group, PLC

(57) ABSTRACT

A brushless motor driving device having a current detecting unit for detecting a phase-current of a brushless motor, a voltage detecting unit for detecting a phase voltage of the brushless motor, and a signal input portion to which the detection value of the phase-current and the detection value of the phase-voltage are input and which has plural input terminals arranged sequentially. The detection values of phase currents or detection values of phase voltages which are different in characteristic are input to adjacent input terminals.

4 Claims, 9 Drawing Sheets

U.S. PATENT DOCUMENTS

| | | | |
|---|---|---|---|
| 6,771,033 B1* | 8/2004 | Kokami et al. | 318/138 |
| 6,798,161 B1* | 9/2004 | Suzuki | 318/434 |
| 6,801,009 B1* | 10/2004 | Makaran et al. | 318/599 |
| 6,806,663 B1* | 10/2004 | Kusaka et al. | 318/254 |
| 6,868,933 B1* | 3/2005 | Kameya | 180/404 |
| 2002/0030462 A1* | 3/2002 | Matsushiro et al. | 318/727 |
| 2003/0117753 A1* | 6/2003 | Kato et al. | 361/18 |
| 2004/0080293 A1* | 4/2004 | Kurosawa et al. | 318/459 |
| 2004/0104704 A1* | 6/2004 | Hirono | 318/722 |
| 2004/0108827 A1* | 6/2004 | Kusaka et al. | 318/254 |
| 2004/0212333 A1* | 10/2004 | Ohtachi et al. | 318/254 |
| 2005/0029976 A1* | 2/2005 | Terry et al. | 318/439 |
| 2005/0184688 A1* | 8/2005 | Hirochi et al. | 318/254 |

FOREIGN PATENT DOCUMENTS

| | | |
|---|---|---|
| JP | A-S61-98192 | 5/1986 |
| JP | A-H04-185114 | 7/1992 |
| JP | A-2003-348884 | 12/2003 |

* cited by examiner

| AD NO. | DET ITEM | CHAR VALUE |
|---|---|---|
| Ch1 | U-PHASE CURRENT |  |
| Ch2 | V-PHASE CURRENT |  |
| Ch3 | W-PHASE CURRENT |  |
| Ch4 | U-PHASE VOLTAGE |  |
| Ch5 | V-PHASE VOLTAGE |  |
| Ch6 | W-PHASE VOLTAGE |  |

FIG. 6

| AD NO. | DET ITEM | CHAR VALUE |
|---|---|---|
| Ch1 | U-PHASE CURRENT | AD (V) vs DUTY (increasing line) |
| Ch2 | U-PHASE VOLTAGE | AD (V) vs DUTY (decreasing line 71; dashed line 72 — INTER-PIN SHORT CIR) |
| Ch3 | V-PHASE CURRENT | AD (V) vs DUTY (increasing line) |
| Ch4 | V-PHASE VOLTAGE | AD (V) vs DUTY (decreasing line 73; dashed line 74 — PIN FLOATED STATE) |
| Ch5 | W-PHASE CURRENT | AD (V) vs DUTY (increasing line) |
| Ch6 | W-PHASE VOLTAGE | AD (V) vs DUTY (decreasing line) |

BRUSHLESS MOTOR DRIVING DEVICE

CROSS REFERENCE TO RELATED APPLICATION

This application is based on and incorporates herein by reference Japanese Patent Application No. 2003-47534 filed on Feb. 24, 2004.

BACKGROUND OF THE INVENTION

1. Field of the Invention

The present invention relates to a brushless motor driving device, and particularly to abnormality detection for AD conversion in a brushless motor driving device.

2. Description of the Related Art

A brushless motor driving device uses phase current (U-phase current, V-phase current, W-phase current) and phase voltage (U-phase voltage, V-phase voltage, W-phase voltage) of a brushless motor in order to control the brushless motor or monitor the status of the brushless motor.

The phase-current and the phase-voltage are passed through a phase-current detection circuit or a phase-voltage detecting current and then input to a microcomputer, and then they are subjected to AD (analog-to-digital) conversion in the microcomputer and used for predetermined processing for motor driving control, etc.

FIG. 12 schematically shows an AD converting circuit. Analog signals from input terminals (Ch1 to Ch4) are input to a multiplexer 61. In the multiplexer 61, a switch 65 selects any one of the input terminals (Ch1 to Ch4) at a predetermining timing, and accumulates the voltage of the input terminal thus selected (Ch1 in FIG. 12) as charges in a capacitor 62. On the basis of the charges thus accumulated, the voltage of the selected input terminal is successively compared with an AD-converted reference voltage in a voltage comparing circuit 63 to determine the voltage of the input voltage. The AD-conversion result of the voltage of the input terminal is stored in a conversion data storing register 64. The microcomputer reads out the AD-conversion result from the conversion data storing register 64 on demand and predetermined processing is carried out.

Here, when Ch1 and Ch2 of these input terminals are short-circuited (inter-pin short-circuit), the voltages of Ch1 and Ch2 are equal to each other, and thus a correct voltage value cannot be achieved.

Particularly the brushless motor driving device has a tendency that when the driving duty of a switching element 301 for driving the U-phase in the motor driving circuit 50 of FIG. 3 increases, the phase-current flowing in the U-phase (that is, AD voltage=voltage after AD-conversion) increases and the phase-voltage (that is, AD voltage) decreases as shown in FIG. 5. The same is true of the V-phase and the W-phase. Accordingly, when the U-phase current, the V-phase current, the W-phase current, the U-phase voltage, the V-phase voltage, the W-phase voltage is input to the neighboring input terminals (Ch1 to Ch6) as shown in FIG. 5, it cannot be detected that Ch1 and Ch2 or Ch5 and Ch6 are short-circuited to each other.

Furthermore, when AD conversion is carried out on the input terminal Ch2 under an open state (pin-floated state) where the input terminal Ch2 is floated from a circuit board due to failure of soldering between the input terminal Ch2 and the circuit board and thus no correct voltage is applied to the input terminal Ch2, the charges corresponding to the voltage of the input terminal Ch1 remain accumulated, so that the AD-conversion result of the voltage of the input terminal Ch1 is stored in the storage area of the input terminal Ch2 of the conversion data storing register 64. Under this state, an opening failure of the input terminal Ch2 cannot be detected.

SUMMARY OF THE INVENTION

The present invention has been implemented in view of the foregoing situation, and has an object to provide a brushless motor driving device which can surely detect a short-circuit failure between input terminals or an opening failure between input terminals.

In order to attain the above object, according to a first aspect of the present invention, there is provided a brushless motor driving device comprising a current detecting unit for detecting phase-currents of a brushless motor, a voltage detecting unit for detecting phase-voltages of the brushless motor, and a signal input portion including plural input terminals to which detection values of the phase-currents and detection values of the phase-voltages are input and which are provided so as to be sequentially arranged, wherein the detection values of the phase-currents or the detection values of the phase-voltages which are different in characteristic are input to adjacent input terminals. When adjacent input terminals are short-circuited to each other (inter-pin short-circuit failure) or an input terminal falls into a pin-floated state, the AD voltage of an input terminal under such a failure is equal to the value of any one of the adjacent input terminals. Accordingly, if the detection values of the phase-currents or the detection values of the phase-voltages which are different in characteristic are input to the adjacent input terminals, it is possible to judge occurrence of the inter-pin short-circuit failure or the pin-floated state when the AD voltages of the adjacent input terminals are coincident with each other.

According to a second aspect of the present invention, the brushless motor driving device according to the present invention is equipped with a motor driving unit containing a switching element for carrying out duty-driving on the motor, and the different characteristics contain a first characteristic in which the detection value increases with increase of the duty, and a second characteristic in which the detection value decreases with increase of the duty.

In the construction of FIG. 6, the characteristics of the AD voltages of the adjacent input terminals with respect to the driving duty of the switching element are opposite to each other. Therefore, for example when Ch1 and Ch2 are short-circuited to each other, the characteristic of the U-phase voltage of the input terminal Ch2 is identical to the U-phase current of the input terminal Ch1 (line 72). Accordingly, if there is detected such a state that the characteristics of the adjacent input terminals Ch1 and Ch2 which are originally different from each other are identical or close to each other, an inter-pin short-circuit failure could be detected.

Furthermore, when the input terminal Ch4 falls into a pin-floated state, the characteristic at the AD conversion time of Ch4 is identical to the characteristic (line 74) at the AD conversion time of Ch3. Therefore, in this case, if there is detected such a state that the characteristics of the adjacent input terminals Ch3 and Ch4 which are originally different from each other are identical or close to each other, a pin-floated failure could be detected.

According to a third aspect of the present invention, the brushless motor driving device according to the present invention is further equipped with a motor driving unit containing a switching element for carrying out duty-driving on the motor, and the different characteristics contain a first characteristic in which the detection value increases or decreases with increase of the duty, and a second characteristic achieved by multiplying the first characteristic by a predetermined coefficient.

FIG. 9A is a schematic diagram showing a circuit construction around the input terminals of the AD converter 31a. On the basis of a voltage dividing ratio based on resistors R1 and R2, an input target signal (voltage) is input after it is converted into an AD-convertible voltage which can be converted in the AD converter 31a. Therefore, as shown in FIG. 9A, if the values of respective resistors R1, R2, R3, R4 are set so that the voltage dividing ratio based on the resistors R1 and R2 and the voltage dividing ratio based on the resistors R3 and R4 are different from each other, the characteristics of voltages input to the AD converter 31a would be different although actual current or voltage values (characteristics) are identical to each other (see FIG. 10).

Accordingly, assuming that the characteristic of the input terminal Ch1 is represented by a line 101 and the characteristic of the input terminal Ch2 is represented by a line 102, the characteristic of the input terminal Ch2 is identical or close to the characteristic of the input terminal Ch1 (line 101) when the input terminals Ch1 and Ch2 fall into the inter-pin short-circuit state. Therefore, by detecting this state, the inter-pin failure can be detected.

Furthermore, for example when the input terminal Ch2 falls into the pin-floated state, the characteristic at the AD conversion time of Ch2 is identical to the characteristic (line 101) at the AD conversion time of Ch1. Accordingly, in this case, the pin-floated failure can be also detected by detecting the state that the characteristics of the adjacent input terminals Ch1 and Ch2 which are originally different from each other are identical or close to each other.

According to a fourth aspect, the detection value of the phase-current in the brushless motor driving device has a first characteristic, the detection value of the phase-voltage has a second characteristic, and the detection value of the phase-current and the detection value of the phase-voltage are alternately input to the input terminals.

The conventional brushless motor driving device as described above adopts the construction that the U-phase current, the V-phase current, the W-phase current, the U-phase voltage, the V-phase voltage and the w-phase voltage are input to the adjacent input terminals (Ch1 to Ch6). However, according to the present invention, attention is paid to the phenomenon that the characteristics of the phase-current and phase-voltage with respect to the duty are opposite to each other, and the present invention adopts the construction that the U-phase current, the U-phase voltage, the V-phase current, the V-phase voltage, the W-phase current, the W-phase voltage are input to the adjacent input terminals (Ch1 to Ch6) as shown in FIG. 6. With respect to the characteristics of the current and voltage of each phase, the detection value of one characteristic increases with increase of the duty, however, the detection value of the other characteristic decreases with increase of the duty. With this construction, it is possible to detect the inter-pin short-circuit failure or the pin-floated state.

According to a fifth aspect, the detection value of the phase-current in the brushless driving device has a second characteristic, the detection value of the phase-voltage has a first characteristic, and the detection value of the phase-current and the detection value of the phase-voltage are alternately input to the input terminals.

As in the case of the fourth aspect, even when the characteristic of the detection value of the phase-current and the characteristic of the detection value of the phase-voltage are counterchanged by each other, these characteristics are kept to be characteristics having opposite tendencies to each other, and thus the inter-pin short-circuit failure or the pin-floated state can be detected by the above construction.

According to a sixth aspect, any one of the detection values of the phase-currents or the detection values of the phase-voltages which have the same characteristic and are input to the adjacent input terminals is altered in characteristic by a characteristic altering unit. With this construction even when the characteristics of the detection values of the phase-currents or the detection values of the phase-voltages which are input to the adjacent input terminals are identical to each other, one characteristic is altered to be different from the other characteristic. Therefore, when the AD voltages of the adjacent input terminals AD are coincident with each other, it is possible to judge occurrence of the inter-pin short-circuit failure or the pin-floated state.

According to a seventh aspect, the characteristic altering unit of the brushless motor driving device multiplies the detection value of the phase-current or the detection value of the phase-voltage by a predetermined coefficient. When one of the detection values of the phase-currents or the detection values of the voltage-phase which originally has a characteristic like the line 101 is multiplexed by a predetermined coefficient, it is changed to a characteristic like the line 102 as shown in FIG. 10. With this construction, one of the characteristics of the two detection values having the same characteristic which are input to the adjacent input terminals is greatly different from the other characteristic. Therefore, when the AD voltages of the adjacent input terminals are coincident with each other, it is possible to judge the inter-pin short-circuit failure or the pin-floated state.

BRIEF DESCRIPTION OF THE DRAWINGS

FIG. 6 is a diagram showing the states of the input terminals (Ch) of an AD converter according to this embodiment;

DETAILED DESCRIPTION OF THE PREFERRED EMBODIMENT

Preferred embodiments according to the present invention will be described hereunder with reference to the accompanying drawings.

According to the present invention, an object of surely detecting a short-circuit failure between input terminals or an opening failure of an input terminal is implemented by a brushless motor driving device in which a current detection value and a voltage detection are alternately input to an input terminal.

<First Embodiment>

Figure 1:
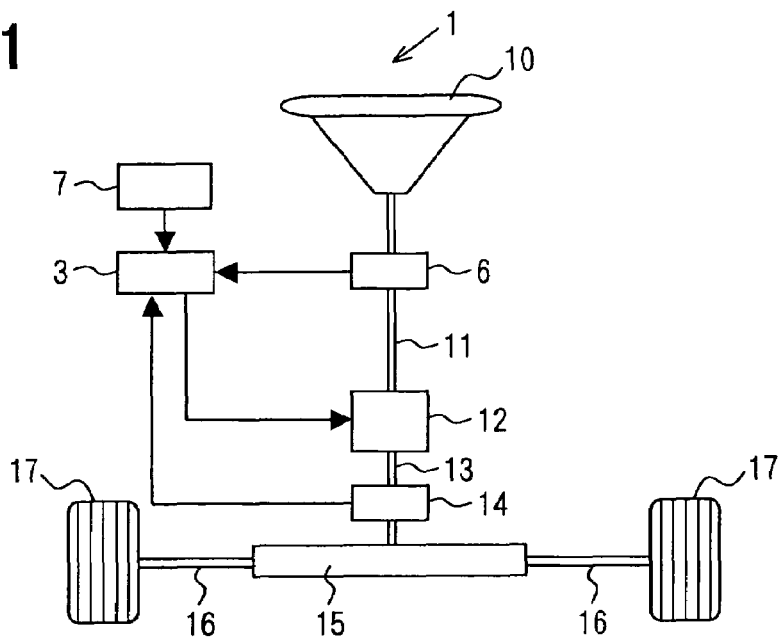
FIG. 1 is a diagram showing the overall construction of a transmission ratio variable control device according to a preferred embodiment.
Figure 2:
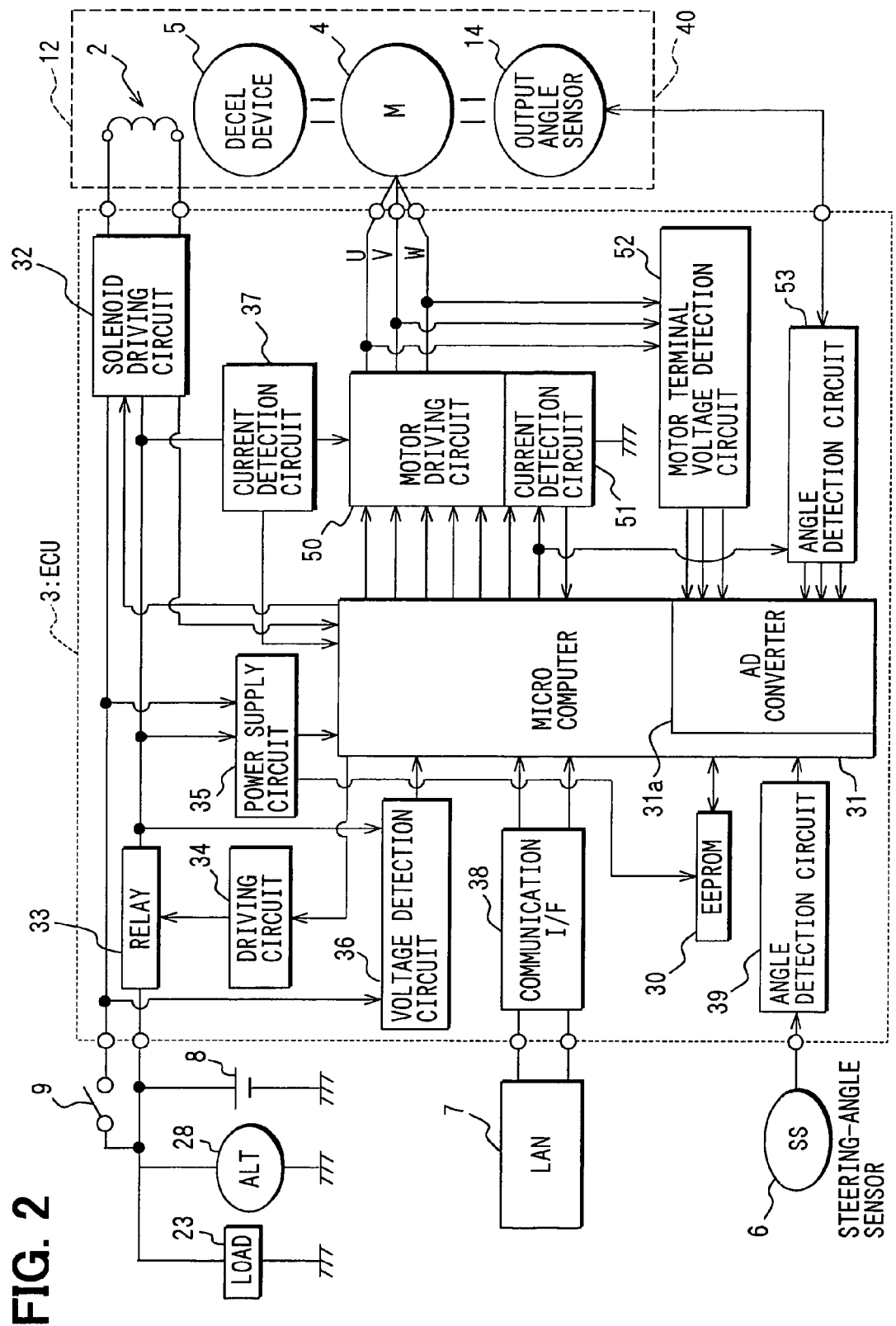
FIG. 2 is a diagram showing the details of a transmission ratio controller.

FIG. 1 shows a case when a brushless motor driving device of the present invention is applied to a transmission ratio variable steering device of a vehicle. FIG. 2 is a block diagram showing the overall circuit construction of the transmission ratio variable steering device 1. The brushless motor driving device may be applied to various devices other than the transmission ratio variable steering device of a vehicle, and the application target is not limited in particular.

First, as shown in FIG. 1, a steering wheel 10 of a wheel is connected to the upper end of an input shaft 11. The lower end of the input shaft 11 and the upper end of an output shaft 13 are connected to each other through a transmission ratio variable unit 12. The lower end of the output shaft 13 is equipped with a pinion (not shown), and the pinion is engaged with a rack 16 in a steering gear box 15. Furthermore, an electric power steering device (not shown) is equipped in the steering gear box 15. A steered wheel 17 is connected to each of both the rack 16 through a tie rod and an arm (not shown).

The input shaft 11 is equipped with a steering angle sensor 6 for detecting a steering angle of the steering wheel 10, and an output angle sensor 14 comprising a resolver for detecting a steering angle of the steered wheels 17 is equipped to the output shaft 13. The output angle sensor 14 may be equipped in the transmission ratio variable unit 12. The steering angle of the input shaft 11 and the rotational angle of the output shaft 13 which are detected by the steering angle sensor 6 and the output angle sensor 14 are input to the transmission ratio controller (ECU) 3. Furthermore, a vehicle velocity signal, an engine rotational number signal, etc. are input from an in-vehicle LAN (Local Area Network) 7 to the transmission ratio controller 3. The transmission ratio controller 3 outputs a control signal for controlling the transmission ratio variable unit 12.

As shown in FIG. 2, the transmission ratio variable unit 12 is equipped with an electric motor 4 which is a well-known brushless motor, and a decelerating device 5, and rotates the electric motor 4 (brushless motor) on the basis of signals from the steering angle sensor 6 and the in-vehicle LAN 7 to vary the rotational angle of the output shaft 13.

In the steering mechanism described above, when the vehicle speed signal from the in-vehicle LAN 7 and the steering angle detected by the steering angle sensor 6 are input to the transmission ratio controller 3, the transmission ratio controller 3 calculates a target rotational angle of the output shaft 13 on the basis of these information. A motor control instruction based on the target rotational angle thus calculated is output as a PWM signal (=Pulse Width Modulation signal) to the transmission ratio variable unit 12. The electric motor 4 of the transmission ratio variable unit 12 is driven on the basis of the motor control instruction, and the steered wheels 17 are supplied with the steered angle corresponding to the rotational angle achieved by adding the target rotational angle of the output shaft 13 with the rotational angle of the steering wheel 10. The transmission ratio controller 3 estimates the actual steered angle of the steered wheels 17 by the output angle sensor 14, and carries out a feedback operation so that the steered angle corresponding to the target rotational angle can be surely supplied to the steered wheels 17.

When the transmission ratio controller 3 detects abnormality of the transmission ration variable unit 12, the transmission ratio controller 3 outputs an instruction to a solenoid driving circuit 32 so that current supply to the solenoid coil 2 is stopped. Accordingly, the input shaft 11 and the output shaft 13 are set to be joined to each other, so that a handle operation can be carried out without using the transmission ratio variable unit 12.

Next, the construction of the transmission ratio variable steering device 1 will be described with reference to FIG. 2.

The solenoid coil 2 is connected to the solenoid driving circuit 32 of the transmission ratio controller 3 described later, and joins the input shaft 11 and the output shaft 13 to each other or releases the joint with electromagnetic force generated in response to a signal from the solenoid driving circuit 32.

The transmission ratio controller 3 (characteristic altering unit of the present invention) controls the current flowing in the solenoid coil 2 and the driving of the electric motor 4 on the basis of the information from the steering angle sensor 6 and the in-vehicle LAN 7, and it comprises a microcomputer 31, the solenoid driving circuit 32, a relay 33, a relay driving circuit 34, a power supply circuit 35, a voltage detecting circuit 36, a current detection circuit 37, a communication I/F (interface) 38, a steering angle detecting circuit 39, a motor driving circuit 50, a current detection circuit (current detecting unit) 51, a motor terminal voltage detecting circuit (voltage detecting unit) 52 and an electrical angle detecting circuit 53.

Figure 4:
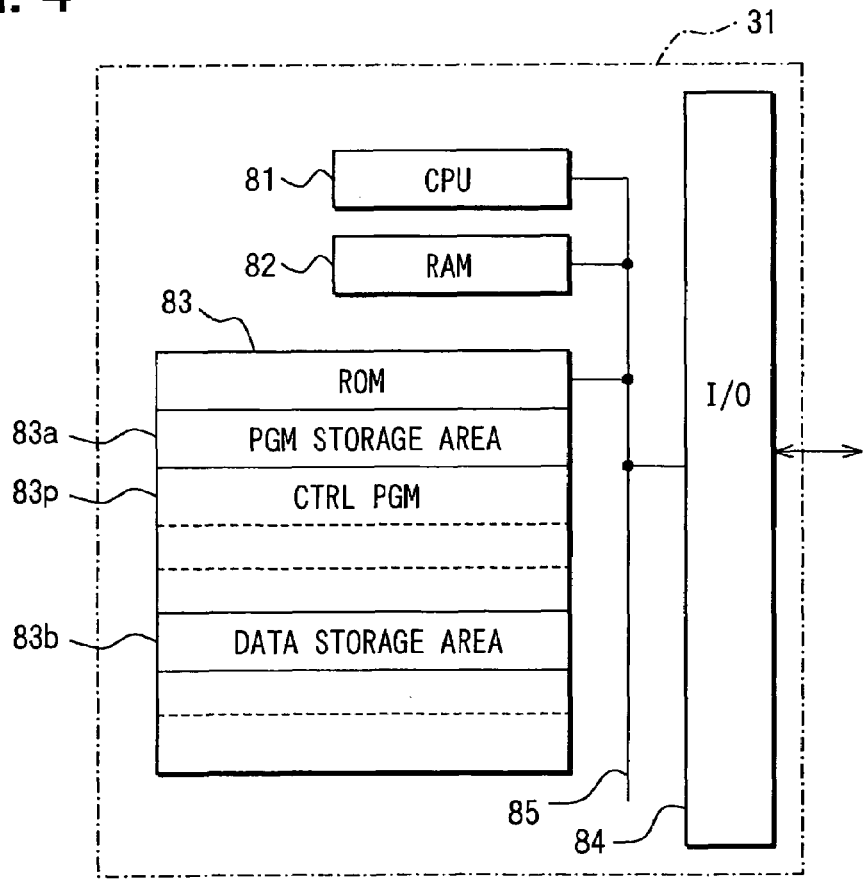
FIG. 4 is a diagram showing the details of a microcomputer.

The microcomputer 31 (the characteristic altering unit of the present invention) calculates the current flowing in the solenoid coil 2 and the electric motor 4 on the basis of the information from the steering angle sensor 6 and the in-vehicle LAN 7, and outputs a control signal on the basis of a calculation value achieved. It comprises well-known CPU 81, ROM 83, RAM 82, I/O 84 serving as an input/output interface, a bus line 85 for connecting these elements, etc. as shown in FIG. 4. Various operation processing based on signals input to the microcomputer 31 and the control signal output processing on respective peripheral circuits by the microcomputer 31 are executed according to a control program 83p stored in ROM 83.

The relay 33 is provided between the battery 8 and the solenoid driving circuit 32. By turning on the relay 33, the battery 8 and the solenoid driving circuit 32 are connected to each other. By turning off the relay 33, the battery 8 and the solenoid driving circuit 32 are disconnected from each other. The relay 33 is turned on or off by the relay driving circuit 34 which is operated on the basis of the control signal from the microcomputer 31.

The power supply circuit 35 is connected to the battery 8 through an IG switch 9, and supplies current from the battery 8 to the microcomputer 31. The voltage detecting circuit 36 detects the voltage value of the battery 8, and inputs the detection value thus detected to the microcomputer 31. The current detection circuit 37 supplies current from the battery 8 to the motor driving circuit 50, and also it detects the current value and inputs the detected current value to the microcomputer 31.

The communication I/F 38 converts the vehicle speed signal, the engine rotational number signal, etc. from the in-vehicle LAN 7 to corresponding signals which can be processed in the microcomputer 31, and the vehicle speed signal and the engine rotational number signal thus converted are input to the microcomputer 31. Furthermore, a signal for forcibly changing the above target rotational angle is input from the in-vehicle LAN 7 to the communication I/F 38 to suppress unstable behavior of the vehicle, and the communication I/F 38 inputs this signal to the microcomputer 31. The signal for forcibly changing the target rotational angle is input to the communication I/F 38 when the steered wheels 17 are slipped, for example.

The steering angle detecting circuit 39 converts the signal from the steering angle sensor 6 to a signal which can be recognized by the microcomputer 31, and then inputs the steering signal thus converted to the microcomputer 31.

Figure 3:
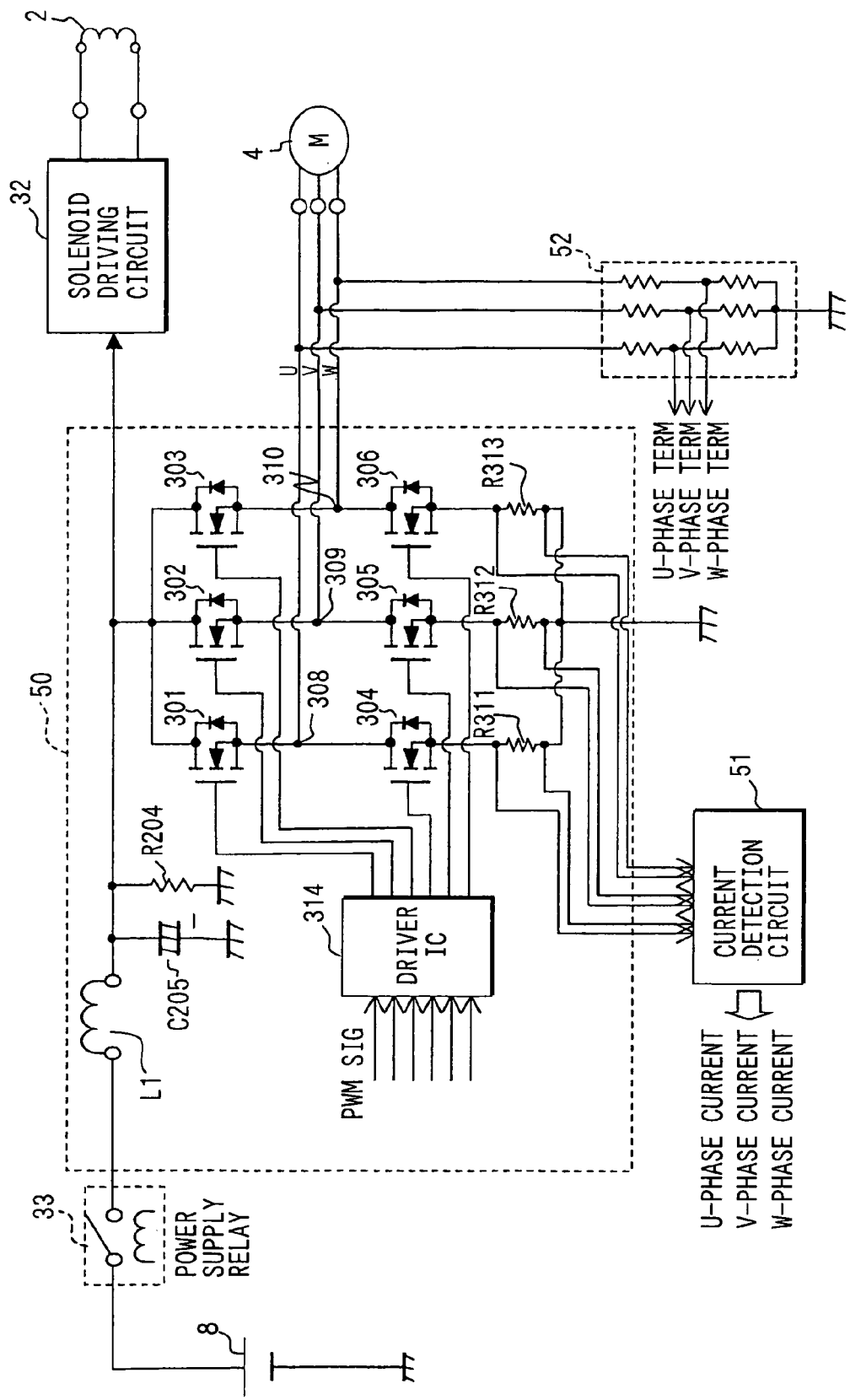
FIG. 3 is a diagram showing the details of a motor driving circuit.
Figure 5:
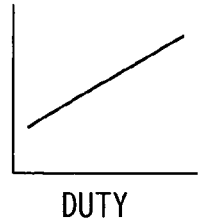
FIG. 5 is a diagram showing the states of input terminals (Ch) of a conventional AD converter.
Figure 5:
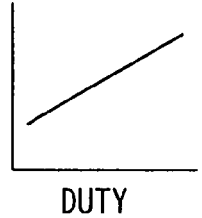
Figure 5:
Figure 5:
Figure 5:
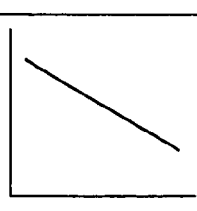
Figure 5:
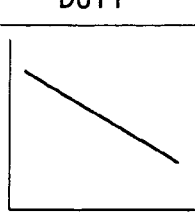
Figure 7:
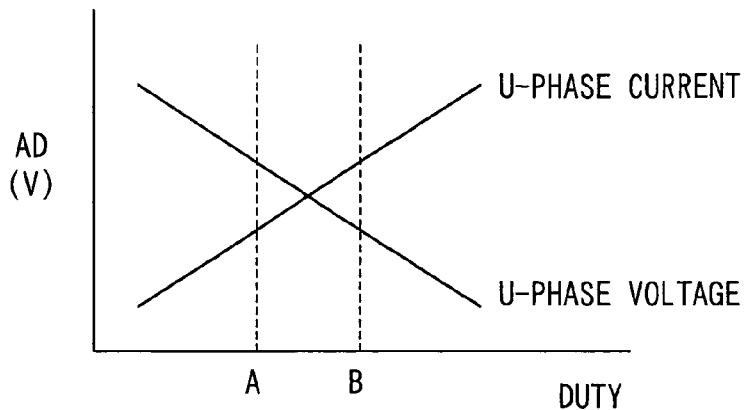
FIG. 7 is a diagram showing the characteristics of current/voltage of adjacent input terminals (first embodiment)

As shown in FIG. 3, the motor driving circuit 50 (motor driving unit) has six switching transistors constituting a well-known three-phase bridge circuit, and carries out PWM duty control on the six switching transistors on the basis of a driving signal from the microcomputer 31 to drive the electric motor 4.

The current detection circuit 51 detects current flowing in each of U-phase, V-phase and W-phase, and inputs the current value thus detected to the AD converter 31a of the microcomputer 31. The motor terminal voltage detecting circuit 52 detects the terminal voltage of each of the U-phase, the V-phase and the W-phase of the motor 4, and inputs the voltage value thus detected to the AD converter 31a of the microcomputer 31.

Returning to FIG. 2, the AD converter 31a is installed in the microcomputer 31, and the input terminals thereof (the signal input portion) are sequentially arranged.

The electrical angle detecting circuit 53 converts the rotational angle (electrical angle) detected by the output angle sensor 14 connected to the decelerating device 5 through the output shaft 13 so that the rotational angle thus converted can be processed by the microcomputer 31, and then inputs the rotational angle thus converted to the microcomputer 31.

As the operation of the transmission ratio variable steering device 1, the microcomputer 31 outputs the control signal to the solenoid driving circuit 32, and the solenoid driving circuit 32 makes current flow in the solenoid 2 to keep the input shaft 11 and the output shaft 13 under the release state. Then, the electric motor 4 is rotated on the basis of the signals from the steering angle sensor 6 and the in-vehicle LAN 7 so that the rotational force of the electric motor 4 is transmitted through the decelerating device 5 to the output shaft 13. The torque of the output shaft 13 to which the rotational force of the electric motor 4 is transmitted is added with the steering force applied by the driver, and the total torque thus achieved is detected by a torque sensor of an electric power steering device, and the steered angle of the steered wheels 17 is varied by the electric motor of the electric power steering device (not shown).

(AD-conversion Abnormality Judging Method 1)

A first method of judging AD-conversion abnormality will be described. This processing is repetitively carried out according to the control program 83p together with other processing during the operation of the transmission ratio variable steering device 1. The input terminals (Ch1 to Ch6) of the AD converter 31a are successively supplied with U-phase current, U-phase voltage, V-phase current, V-phase voltage, W-phase current and W-phase voltage in this order from Ch1 as shown in FIG. 6.

Figure 8:
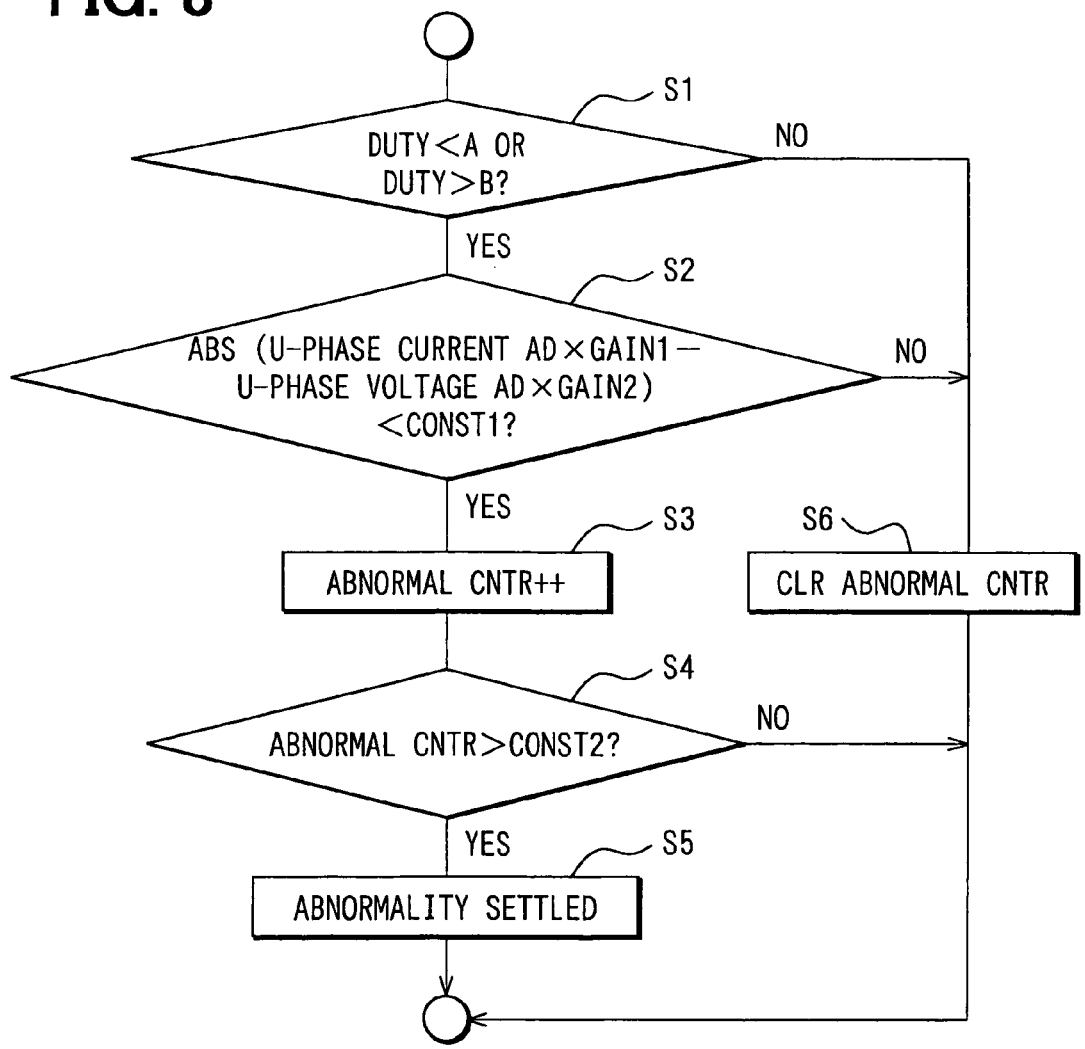
FIG. 8 is a flowchart showing AD conversion abnormality judging processing (first embodiment)

FIG. 8 is a flowchart showing the flow of the AD-conversion abnormality judging processing, that is, the flow of the processing of detecting the inter-terminal short-circuit between U-phase current and U-phase voltage (that is, the input terminals Ch1, Ch2 of FIG. 6). The same detection method is also applied to the short-circuit between the other adjacent input terminals (Ch). For example, when the input terminals Ch1 and Ch2 are short-circuited to each other in FIG. 6, the same characteristic value as the input terminal Ch1 appears in the input terminal Ch2.

Furthermore, a state where each input terminal is floated from the circuit board (so-called pin floated state) can be also detected by the above processing. For example, when the input terminal Ch4 falls into the pin floated state in FIG. 6, the characteristics of the duty and AD voltage of Ch4 are identical to the characteristics of the input terminal Ch3, and the AD conversion result of Ch4 matches the AD conversion result of Ch3.

First, when the duty of a switching element 301 (see FIG. 3) for controlling the driving of U-phase is not within a predetermined range (S1:NO), the value of an abnormality counter is cleared (S6), and the processing is finished. Here, the predetermined range is defined as a range in which the difference in AD voltage between the U-phase current and the U-phase voltage is larger than a predetermined value. In this range, the duty of the switching element 301 has a smaller value than a duty A or a larger value than a duty B.

When the duty of the switching element 301 is within the predetermined range (S1:YES), the absolute value of the difference between the multiplication of the AD voltage of the U-phase current and a predetermined coefficient (Gain1) and the multiplication of the AD voltage of the U-phase voltage and a predetermined coefficient (Gain2) is calculated. The absolute value thus calculated is compared with a predetermined threshold value Const1.

If the calculated absolute value is not less than the threshold value Const1 (S2:NO), it is judged that the difference in AD voltage between the U-phase current and the U-phase voltage is sufficiently large, and thus it is judged that no inter-terminal short-circuit occurs. Therefore, the value of the abnormality counter is cleared (S6), and the processing is finished. On the other hand, if the calculated absolute value is smaller than the threshold value Const1 (S2: YES), it is judged that the difference in AD voltage between the U-phase current and the U-phase voltage is sufficiently small. Therefore, it is judged that the inter-terminal short-circuit or the pin floated state occurs, and the abnormality counter is renewed (S3).

When the value of the abnormality counter is larger than a predetermined threshold value Const2 (the state where the inter-terminal short-circuit occurs continues for a predetermined time or more) (S4:YES), the inter-terminal short-circuit abnormality is settled, and predetermined processing of stopping the motor, etc. is carried out (S5). On the other hand, if the value of the abnormality counter is not more than the threshold value Const2 (S4:NO), the processing is finished without taking any operation.

The coefficient Gain1 and the coefficient Gain2 are set to make the comparison of the difference in AD voltage between the U-phase current and the U-phase voltage simple. The duty A, the duty B, the threshold value Const1, the threshold value Const2, the coefficient Gain1 and the coefficient Gain2 are stored in a data storage area 83b of ROM 83, EEPROM (ElectricallyErasable & Programmable Read Only Memory) 30 or the like in advance.

<Second Embodiment>

(AD Conversion Abnormality Judging Method 2)

Next, a second method of the AD conversion abnormality judging processing of the present invention will be described with reference to the flowchart of FIG. 11. This processing is repetitively executed together with other processing according to a control program 83p during the operation of the transmission ratio variable steering device 1. The second embodiment corresponds to a modification of the first embodiment. Therefore, the same elements as the first embodiment are represented by the same reference numerals, and the description on the same parts of the functions and operations as the first embodiment are omitted from the following description.

Figure 9A:
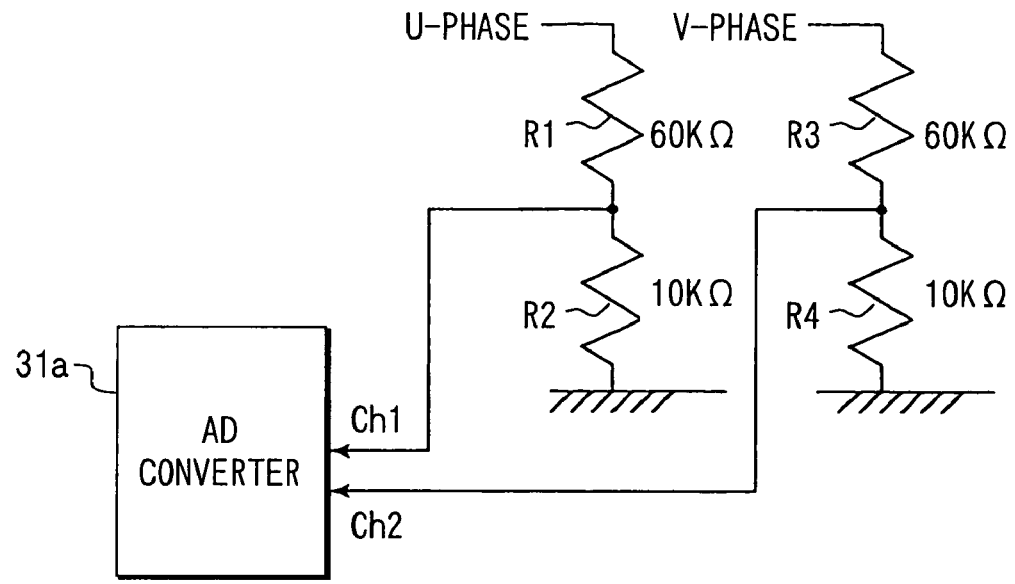
FIG. 9 is a diagram showing a circuit construction for input to the AD converter (Second embodiment)
Figure 9B:
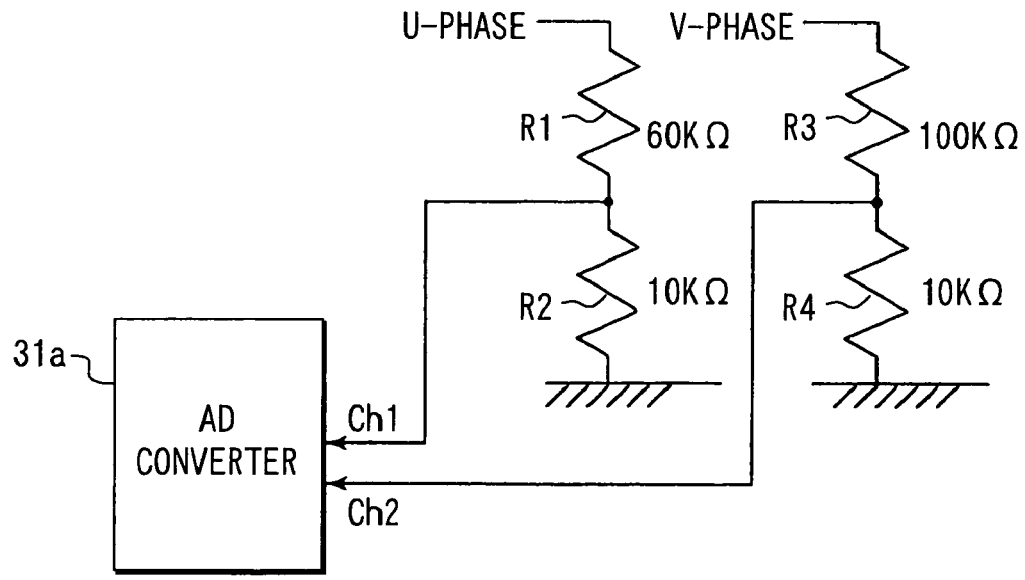
Figure 10:
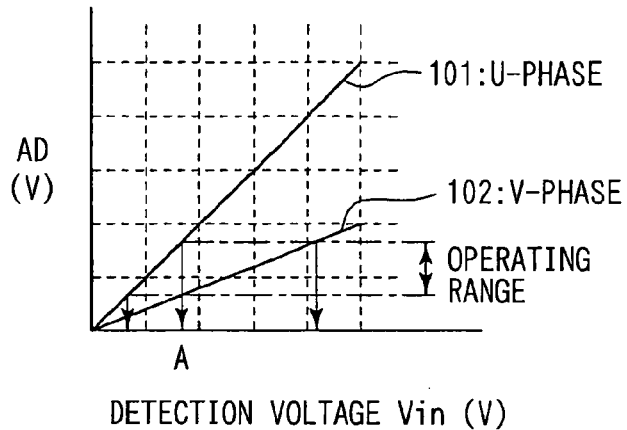
FIG. 10 is a diagram showing the characteristics of current/voltage of adjacent input terminals (second embodiment)

Referring to FIGS. 9A–9B, the phase currents or phase voltages which have substantially the same characteristic are input to the AD converter 31a while the voltages thereof are divided by resistors R1 and R2 and resistors R3 and R4 respectively in order to be adapted to an input-permissible voltage range of the AD converter 31a. Here, the voltage-dividing ratio based on the resistors R3 and R4 of one phase-current (V-phase) of the phase currents (for example, U-phase, V-phase) having substantially the same characteristic of the adjacent input terminals is varied as shown in FIG. 9B, the relationship between the voltage input to the AD converter 31a (detection voltage Vin) and the AD voltage after AD conversion is greatly different between the U-phase and the V-phase as shown in FIG. 10. In the case of FIG. 9A, even when the voltages of the U-phase and the V-phase are equal to each other, the U-phase voltage input to the AD converter 31a is equal to 1.4 times of the V-phase voltage. Accordingly, it is possible to judge the inter-pin short-circuit failure or the pin-floated state.

Figure 11:
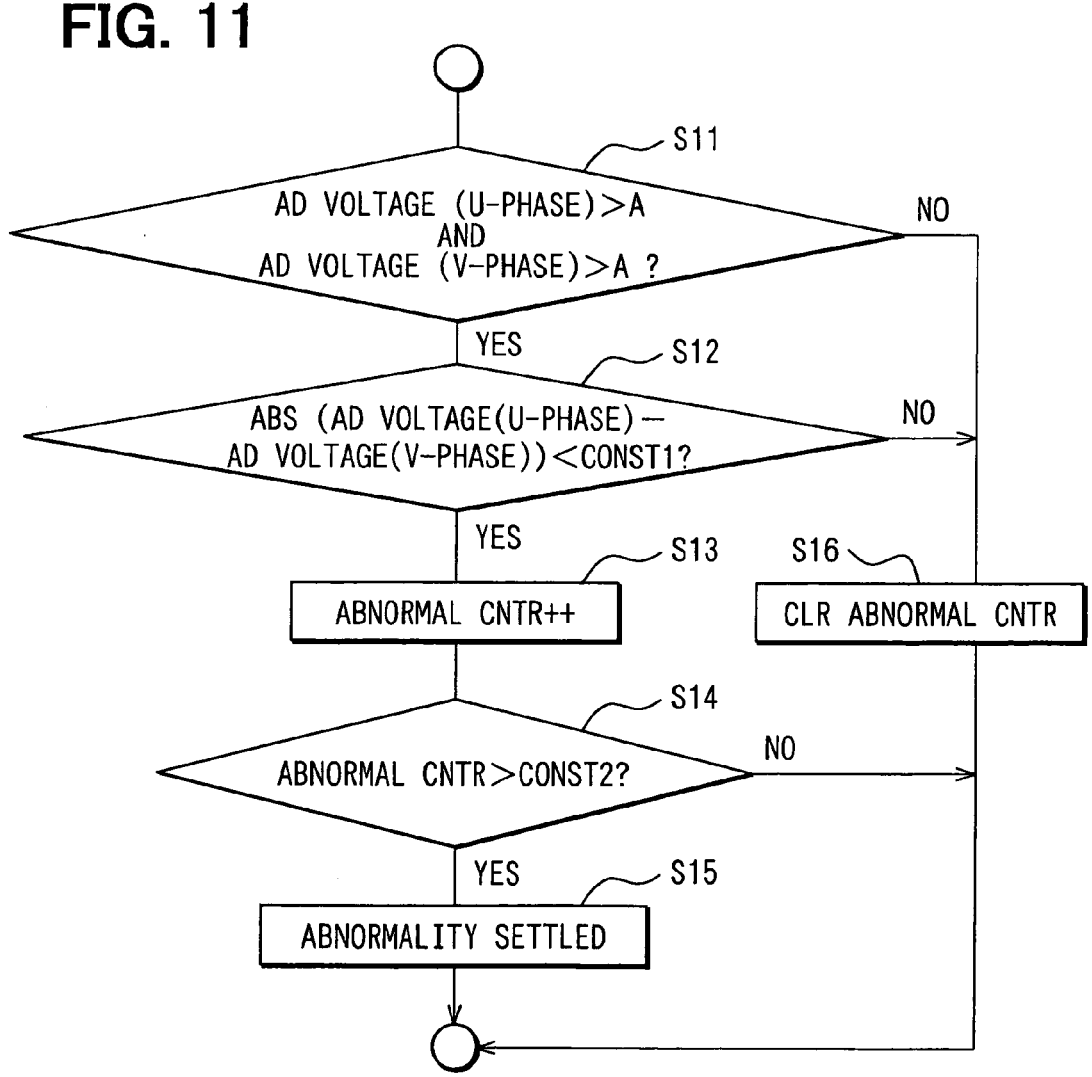
FIG. 11 is a flowchart showing an AD conversion abnormality judging processing (Second Embodiment)
Figure 12:
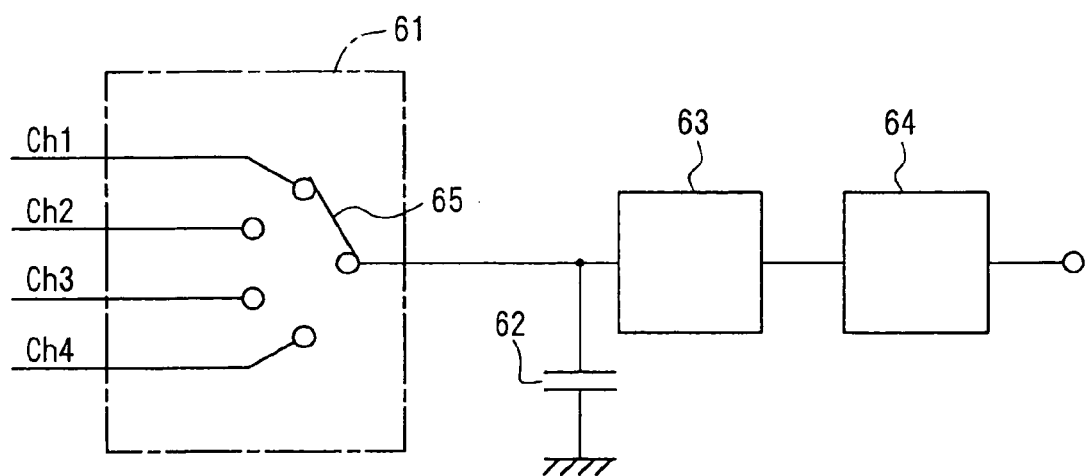
FIG. 12 is a diagram showing the construction of the AD converter.

Referring to FIG. 11, first, when the AD voltages of the U-phase voltage and V-phase voltage are not within a predetermined range (S11:NO), the value of the abnormality counter is cleared (S16), and the processing is finished. Here, the predetermined range is defined as a range in which the difference between the U-phase voltage and the V-phase voltage is larger than a predetermined value, and in this range, the difference is larger than a predetermined voltage A and also smaller than 5V which is the upper limit value of the AD converter 31a.

If the AD voltages of the U-phase voltage and the V-phase voltage are within the predetermined range (S11:YES), the absolute value of the difference between the U-phase voltage and the V-phase voltage is calculated. The absolute value thus calculated is compared with the predetermined threshold value Const1.

When the absolute value thus calculated is not less than the threshold value Const1 (S12:NO), it is judged that the difference in AD voltage between the U-phase voltage and the V-phase voltage is sufficiently large. Therefore, it is judged that no inter-terminal short-circuit occurs, and the value of the abnormality counter is cleared (S16), and the processing is finished. On the other hand, if the absolute value thus calculated is smaller than the threshold value Const1 (S12:YES), it is judged that the difference in AD voltage between the U-phase voltage and the V-phase voltage is small. Therefore, it is judged that inter-terminal short-circuit or a pin-floated state occurs, and the abnormality counter is renewed (S13).

If the value of the abnormality counter is larger than the threshold value Const2 (the state in which the inter-terminal short-circuit occurs is continued for a predetermined time or more) (S14:YES), the inter-terminal short-circuit abnormality is settled, and predetermined processing of stopping the motor 4, etc. is carried out (S15). On the other hand, if the value of the abnormality counter is not more than the threshold value Const2 (S14:NO),the processing is finished without taking no action.

In this embodiment, the adjacent inputs may have substantially the same characteristics, and the present invention is applicable to inputs other than phase current or phase voltage. For example, a voltage IG supplied to the microcomputer 31 and the peripheral circuits thereof and a voltage PIG supplied mainly to the solenoid driving circuit 32 or the motor driving circuit 50 are supplied from the battery 8, and thus they have substantially the same characteristic. However, when using a circuit in which the voltage dividing ratio of the resistors for inputting IG and PIG to the AD converter 31a by using the example of FIG. 9A, the relationship between the detection voltage and the AD voltage after the AD conversion is greatly different. According to the present construction, the short-circuit between adjacent input terminals of IG and PIG or the pin-floated state can be detected.

Furthermore, the voltage A, the threshold value Const1 and the threshold value Const2 are stored in the data storage area 83b of ROM 83, EEPROM 30 or the like.

The above embodiments are merely described for the purpose of exemplification of the present invention, and the present invention is not limited to these embodiments. Accordingly, various modifications may be made based on the knowledge of persons skilled in the art to the above embodiments without departing from the subject matter of the present invention.

What is claimed is:

1. A brushless motor driving device comprising:
   a current detecting unit for detecting phase-currents of a brushless motor;
   a voltage detecting unit for detecting phase-voltages of the brushless motor;
   a motor driving unit comprising a switching element for carrying out duty-driving on the brushless motor; and
   a signal input portion including a plurality of input terminals to which detection values of the phase-currents and detection values of the phase-voltages are alternately input, wherein one of the detection values of the phase-currents that has a first characteristic and one of the detection values of the phase-voltages that has a second characteristic are input to adjacent input terminals of the plurality of input terminals, wherein the first characteristic comprises one of an increase and a decrease of the one of the detection values of the phase-currents with increase in duty and the second characteristic comprises the other of the increase and the decrease of the one of the detection values of the phase-voltages with increase in duty.

2. A brushless motor driving device comprising:
   a current detecting unit for detecting phase-currents of a brushless motor;
   a voltage detecting unit for detecting phase-voltages of the brushless motor;
   a motor driving unit comprising a switching element for carrying out duty-driving on the motor;
   an analog to digital converter for converting the phase-currents and phase-voltages of the brushless motor into a digital signal; and
   a signal input portion of the analog to digital converter including a plurality of input terminals to which detection values of the phase-currents and detection values of the phase-voltages are alternately input, wherein one of the detection values of the phase-currents that has a first characteristic and one of the detection values of the phase-voltages that has a second characteristic are input to adjacent input terminals of the plurality of input terminals, wherein the first characteristic comprises the detection value increases or decreases with increase of the duty, and the second characteristic is achieved by multiplying the first characteristic by a predetermined coefficient.

3. The brushless motor driving device of claim 2, wherein a first of the adjacent input terminals of the plurality of input terminals to which the one of the detection values of the phase-currents that has the first characteristic is input includes resistors having a voltage-dividing ratio corresponding to the first characteristic, and a second of the adjacent input terminals of the plurality of input terminals to which the one of the detection values of the phase-voltages that has the second characteristic is input includes resistors having a voltage-dividing ratio corresponding to the second characteristic.

4. A brushless motor driving device comprising:
   a current detecting unit for detecting phase-currents of a brushless motor;
   a voltage detecting unit for detecting phase-voltages of the brushless motor;
   a motor driving unit comprising a switching element for carrying out duty-driving on the brushless motor; and
   a signal input portion including a plurality of input terminals to which detection values of the phase-currents and detection values of the phase-voltages are alternately input, wherein one of the detection values of the phase-currents that has a first characteristic and one of the detection values of the phase-voltages that has a second characteristic are input to adjacent input terminals of the plurality of input terminals, wherein the first characteristic comprises one of an increase and a decrease of a relationship between analog to digital voltage and duty and the second characteristic comprises the other of the increase and the decrease of the relationship between analog to digital voltage and duty.

* * * * *